UNITED STATES PATENT OFFICE.

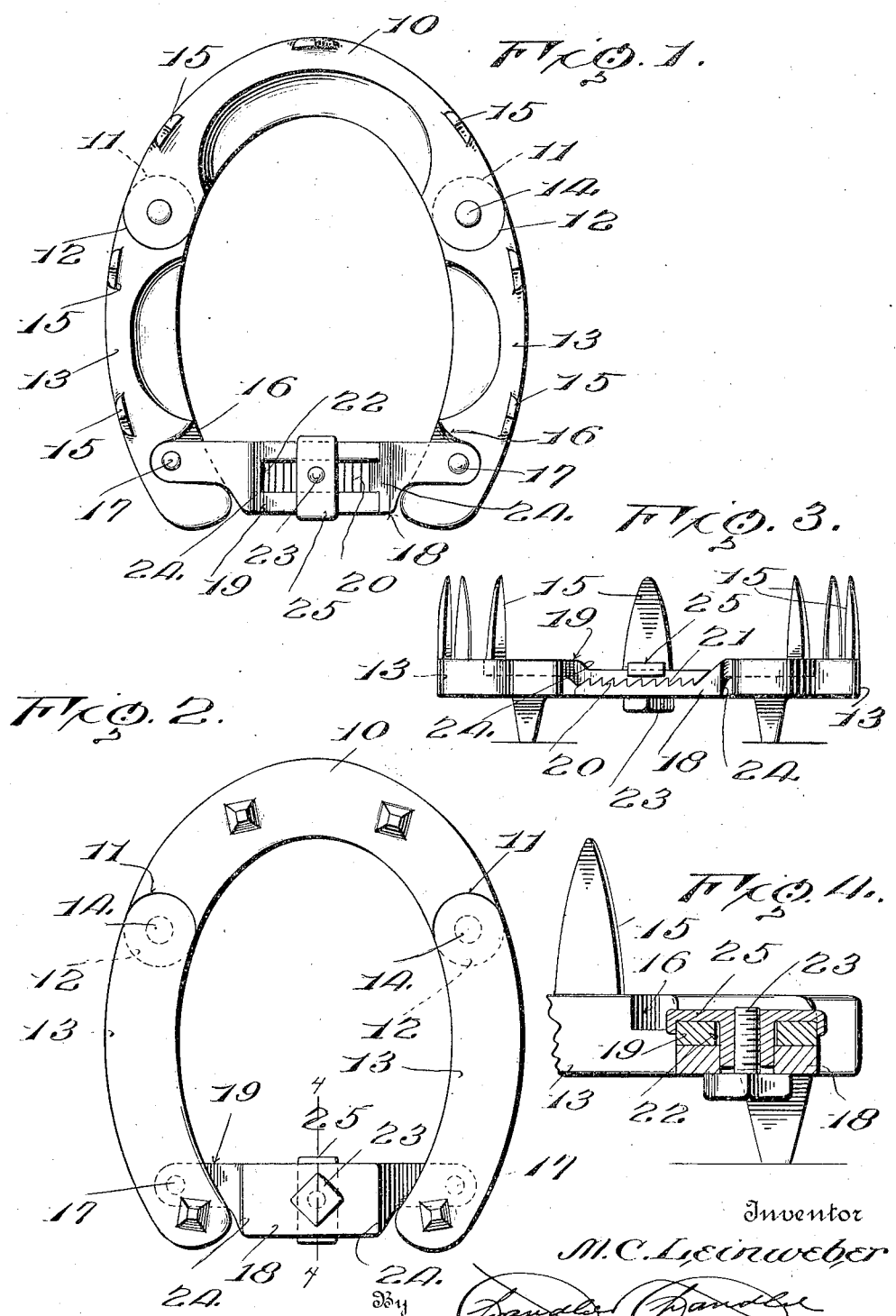

MARY C. LEINWEBER, OF WEIMAR, TEXAS.

HORSESHOE.

1,351,769.

Specification of Letters Patent.   Patented Sept. 7, 1920.

Application filed December 26, 1918.   Serial No. 268,241.

*To all whom it may concern:*

Be it known that I, MARY C. LEINWEBER, a citizen of the United States, residing at Weimar, in the county of Colorado, State of Texas, have invented certain new and useful Improvements in Horseshoes; and I do hereby declare the following to be a full, clear, and exact description of the invention, such as will enable others skilled in the art to which it appertains to make and use the same.

This invention relates to new and useful improvements in horseshoes and particularly to nailless horseshoes.

One object of the present invention is to provide a novel and improved horseshoe which is readily capable of being applied to the hoof without the use of nails, and which can be easily and quickly removed from the hoof.

Another object of the invention is to provide a novel and improved shoe which is capable of easy and quick adjustment to fit any size of hoof.

A further object is to provide a novel and improved shoe which will readily expand and contract with the hoof while in use.

Other objects and advantages will be apparent from the following description when taken in connection with the accompanying drawing.

In the drawing:

Figure 1 is a top plan view of a shoe made in accordance with my invention;

Fig. 2 is a bottom plan view of the same;

Fig. 3 is a rear elevation of the shoe, and Fig. 4 is an enlarged sectional view taken on the line 4—4 of Fig. 2.

Referring particularly to the accompanying drawing, 10 represents the front or toe portion of the shoe in the ends of which are formed the nether recesses or rabbets 11 for the interfitting engagement of the correspondingly formed rabbets 12 in the forward ends of the side portions 13 of the shoe. Rivets 14 are disposed vertically through the said interfitting portions of the shoe whereby the shoe is capable of being opened and closed when applying or removing the shoe. Formed integrally on the outer edges of the sections 10 and 13 are the vertically extending tangs 15 which are arranged to be bent over against the outer inclined surface of the hoof of the horse's foot, and whereby the shoe will be held to the hoof without the use of nails which are destructive to the hoof.

In the inner portions of the upper faces of the rear ends of the side members 13 are the recesses 16; and disposed in said recesses, and held therein by the pivot members 17, are the outer ends of the adjusting members 18 and 19 respectively. The inner portion of the member 18, which extends between the rear ends of the sections 13, has the transverse ratchet teeth or ribs 20 for interfitting engagement with the similar teeth 21 formed on the lower face of the inner end of the member 19, which member overlaps the member 18, as clearly seen in Fig. 3. This inner end portion of the member 19 is longitudinally bifurcated, as shown at 22, to permit the passage of the screw or bolt 23 therebetween and through the member 18, and whereby the member 19 is capable of slidable movement with respect to the member 18, when the shoe is to be adjusted to fit the hoof.

It will be noted that the members 18 and 19 are offset downwardly, as at 24, so that the transverse plate 25, which is disposed on the member 19, and which receives the threaded end of the bolt, may lie flush with or below the upper surface of the shoe, and thus not interfere with the foot or cause injury or annoyance while in use.

There is provided sufficient play in the pivotal connections whereby the sections of the shoe will open and close in conformity with the expanding and contracting movements of the hoof.

What is claimed is:

A horseshoe comprising pivoted sections certain of which are formed with terminal recesses and openings therethrough, links pivotally connected to the said certain links and within said recesses, one of the links being longitudinally bifurcated and having teeth formed on one face of each leg thereof, the other link having teeth extending across one face and engaging with the teeth of the first link, said other link having a central opening therethrough, a plate disposed transversely of the bifurcated link and having its ends turned to engage with the outer faces of the legs thereof, said plate having a central internally-threaded tubular extension disposed through the bifurcation of one link and the opening of the other link, and a bolt engaged through the tubular extension, the links, and the plate, from the face opposite to that on which the plate is disposed.

In testimony whereof, I affix my signature, in the presence of two witnesses.

MARY C. LEINWEBER.

Witnesses:
W. L. SHAVER,
J. A. OAKLEY.